United States Patent
Kecicioglu (10) Patent No.: US 11,166,311 B2
(45) Date of Patent: Nov. 2, 2021

(54) SYSTEMS AND METHODS UTILIZING CHANNEL SPATIAL PROPERTIES WITH CSMA

(71) Applicant: CABLE TELEVISION LABORATORIES, INC, Louisville, CO (US)

(72) Inventor: Balkan Kecicioglu, Erie, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 103 days.

(21) Appl. No.: 15/910,798

(22) Filed: Mar. 2, 2018

(65) Prior Publication Data

US 2018/0255582 A1 Sep. 6, 2018

Related U.S. Application Data (60) Provisional application No. 62/466,098, filed on Mar. 2, 2017.

(51) Int. Cl.
*H04W 74/08* (2009.01)
*H04B 17/318* (2015.01)
*H04W 16/28* (2009.01)
*H04W 72/04* (2009.01)
*H04W 84/12* (2009.01)

(52) U.S. Cl.
CPC ...... *H04W 74/0816* (2013.01); *H04B 17/318* (2015.01); *H04W 16/28* (2013.01); *H04W 72/046* (2013.01); *H04W 84/12* (2013.01); *Y02D 30/70* (2020.08)

(58) Field of Classification Search
CPC ................................................ H04W 74/0816
See application file for complete search history.

(56) References Cited

U.S. PATENT DOCUMENTS

| | | | |
|---|---|---|---|
| 2007/0298742 A1* | 12/2007 | Ketchum | H04B 7/0643 455/186.1 |
| 2014/0362840 A1* | 12/2014 | Wong | H04W 72/12 370/338 |
| 2015/0103707 A1* | 4/2015 | Panta | H04W 4/38 370/311 |
| 2015/0281993 A1* | 10/2015 | Chen | H04B 7/024 370/338 |
| 2016/0105227 A1* | 4/2016 | Lin | H04W 72/0413 370/329 |
| 2017/0325222 A1* | 11/2017 | Cariou | H04W 74/0816 |
| 2018/0176921 A1* | 6/2018 | Cariou | H04W 16/10 |
| 2018/0242176 A1* | 8/2018 | Yang | H04B 17/318 |
| 2018/0242364 A1* | 8/2018 | Park | H04W 24/08 |
| 2018/0270038 A1* | 9/2018 | Oteri | H04L 5/0037 |

* cited by examiner

*Primary Examiner* — Kodzovi Acolatse
*Assistant Examiner* — Abdeltif Ajid
(74) *Attorney, Agent, or Firm* — Armstrong Teasdale LLP (57) ABSTRACT

A wireless communication node includes a transmitting portion configured to transmit over a wireless communication channel a plurality of data packets to a first neighboring node, a receiving portion configured to detect the first neighboring node, and a processor configured to calculate a beamforming vector for the first neighboring node and direct the transmitting portion to transmit the plurality of data packets to the first neighboring node with beamforming based on the calculated beamforming vector.

17 Claims, 5 Drawing Sheets

SYSTEMS AND METHODS UTILIZING CHANNEL SPATIAL PROPERTIES WITH CSMA

CROSS REFERENCE TO RELATED APPLICATIONS

This application claims the benefit of and priority to U.S. Provisional Patent Application Ser. No. 62/466,098, filed Mar. 2, 2017, which is incorporated herein by reference in its entirety.

BACKGROUND

The field of the disclosure relates generally to wireless communication networks, and more particularly, to wireless communication networks utilizing carrier sense multiple access (CSMA).

CSMA with collision avoidance (CSMA/CA) is a network multiple access method, sometimes referred to as "listen-before-talk" (LBT), in which nodes utilize carrier sensing, but attempt to avoid collisions by transmitting only when the channel is sensed to be idle (i.e., not being used). The CSMA/CA protocol typically operates in the data link layer of the telecommunication model of the network. Conventional Wi-Fi, Long Term Evolution (LTE) Licensed Assisted Access (LAA), and MulteFire technologies have recently adopted the CSMA/CA scheme as a mechanism for medium access control (MAC). In such conventional schemes, a transmitter/transceiver of a node defers its transmission (when another node is detected) and applies an additional back off time before starting its own transmission. During this back off time, the node monitors the channel and performs clear channel assessment (CCA). If the channel is not busy at the end of this period, the transmitter/transceiver initiates transmission. The transmitting node then monitors the environment using uniform a beam-pattern, listening for transmissions from all directions.

Figure 1:
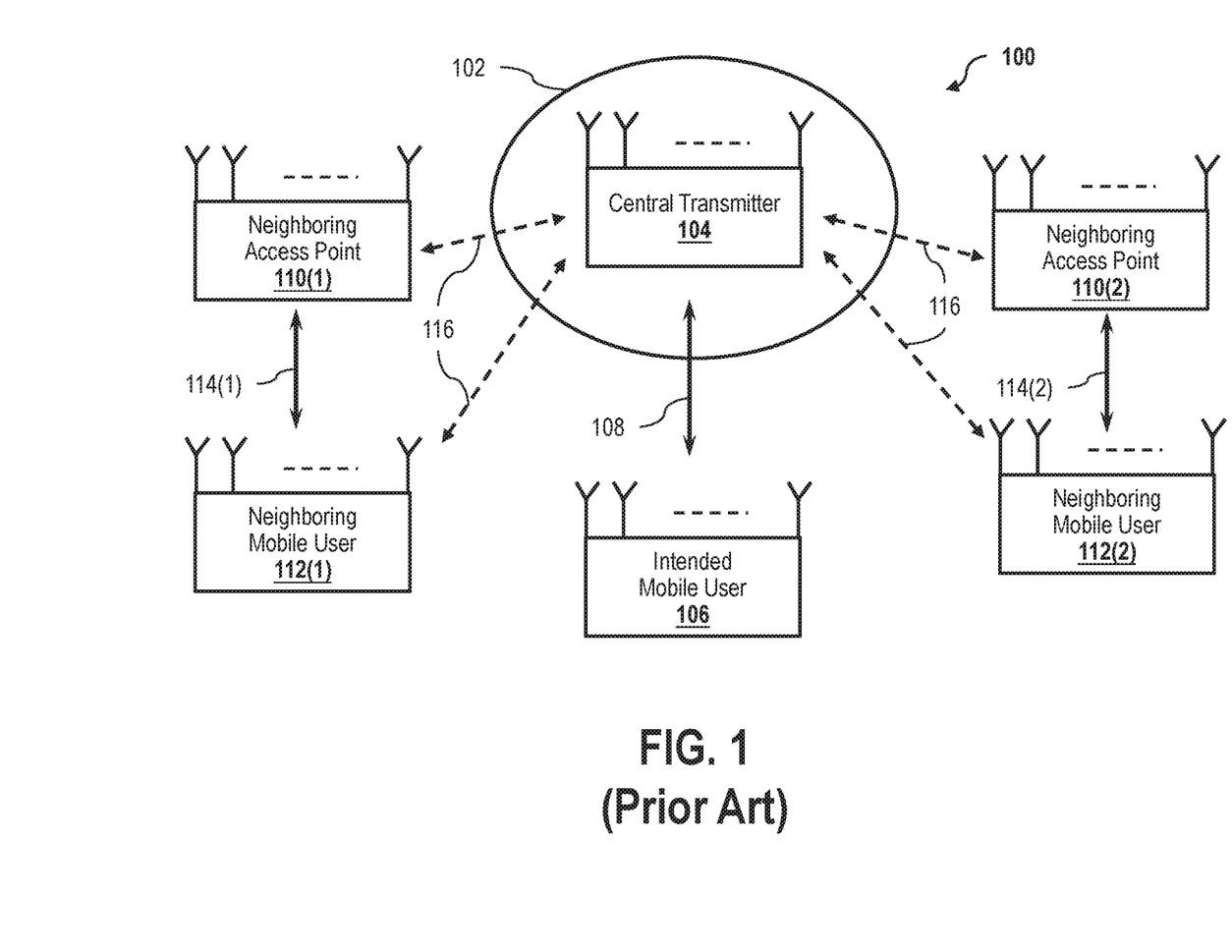
FIG. 1 is a schematic illustration of a conventional wireless transmission system employing CSMA/CA for a uniform beam pattern.

FIG. 1 is a schematic illustration of a conventional wireless transmission system 100 employing CSMA/CA for a uniform beam pattern 102 radiating from a central transmitter 104. System 100 implements a CSMA/CA protocol in a Wi-Fi/LTE LAA environment. Central transmitter 104 is, for example, a transmitting access point (AP). System 100 includes an intended mobile user 106, which wirelessly receives signals from central transmitter 104 over a communication link 108 under consideration. System 100 further includes a plurality of neighboring APs 110 and a plurality of neighboring mobile users 112, respectively communicating over neighboring links 114.

In this example, the respective APs and mobile users are illustrated as having multiple antennas. In practical operation, a given AP will typically have more antennas and more signal processing capability than a typical mobile user. Operation of neighboring APs 110 and neighboring mobile users 112 generates interferences 116 to and from central transmitter 104. Because beam pattern 102 is uniform in all directions from central transmitter 104, central transmitter backs off equally in the respective focus direction of each interference 116, when detected, and therefore represents an inefficient application of transmission resources.

BRIEF SUMMARY

In an embodiment, a wireless communication node includes a transmitting portion configured to transmit over a wireless communication channel a plurality of data packets to a first neighboring node, a receiving portion configured to detect the first neighboring node, and a processor configured to calculate a beamforming vector for the first neighboring node and direct the transmitting portion to transmit the plurality of data packets to the first neighboring node with beamforming based on the calculated beamforming vector.

In an embodiment, a method for transmitting over a wireless communication channel is provided. The method is implemented by a first node employing a carrier sense multiple access (CSMA) protocol. The method includes steps of detecting channel state information of a second node within a transmission vicinity of the first node, calculating a beamforming vector to transmit data from the first node to the second node, performing clear channel assessment on the wireless communication channel using the calculated beamforming vector, measuring an average received power of the wireless communication channel based on the clear channel assessment, determining that the measured average received power of the wireless communication channel is less than a predetermined energy detection threshold, and initiating, by the first node, a data transmission with beamforming over the wireless communication channel.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

"User equipment" includes an electronic device or system utilizing a technology protocol such as LTE, and "Wi-Fi device" includes an electronic device or node, such as an AP, station, or STA, that is capable of utilizing an existing 802.11 protocol. "Mobile user" may include a user equipment and/or a Wi-Fi device, and may further include, without limitation, one or more of a laptop, a personal computer (PC), a personal digital assistant (PDA), a Wi-Fi phone, a smartphone, and a cellular telephone. The respective nodes and user devices may include a transceiver or transmitter and receiver combination, and/or an 802.11-conforming MAC layer and physical (PHY) layer interface to a wireless medium.

The following description features systems and methods for incorporating the spatial properties of a channel transmission in a CSMA scheme, which may include a CSMA/CA access system. The present embodiments relate to operation and management of a transmitter or transceiver using the spatial properties of the transmission channel, and methods for efficient coexistence of neighboring nodes utilizing CSMA/CA.

In the exemplary embodiment, a CSMA strategy is implemented for a transmitting node employing beamforming to focus the node's transmission energy in a spatial direction of interest to reduce the interference from and to other nodes. RTS, CTS, and ACK frame transmissions may be transmitted according to conventional techniques, without beamforming, to allow continued measurement of potential interferers. Through the advantageous techniques described herein, spatial diversity of the channel is utilized to enable increased communication in dense deployments of nodes.

Recent wireless technologies employ multiple antennas to increase throughput and/or improve robustness. Beamforming is a multiple antenna transmission technique that focuses radiated energy in the direction(s) of interest to provide additional gains at the receiver. The systems and methods herein advantageously employ beamforming to focus the signal of the transmitter in limited directions, that is, more in some directions than others. The signal therefore will not cause uniform interference to other nodes in all directions. Hence, because it is inefficient for the transmitter to back off signals in all directions at the same energy detection level, the transmitter of the present embodiments backs off only in directions overlapping with its beamformed transmission.

The present embodiments achieve beamforming transmission primarily in two different ways: (1) based on the channel measurement of the reverse link and making use of channel reciprocity (applicable, for example, with time division duplex (TDD)); or (2) based on the channel measurement and feedback from the receiver. In either way, the radiated energy is focused along main reflected paths, toward an intended node, thereby reducing interference to other users/nodes, as shown in FIG. 2, below.

Figure 2:
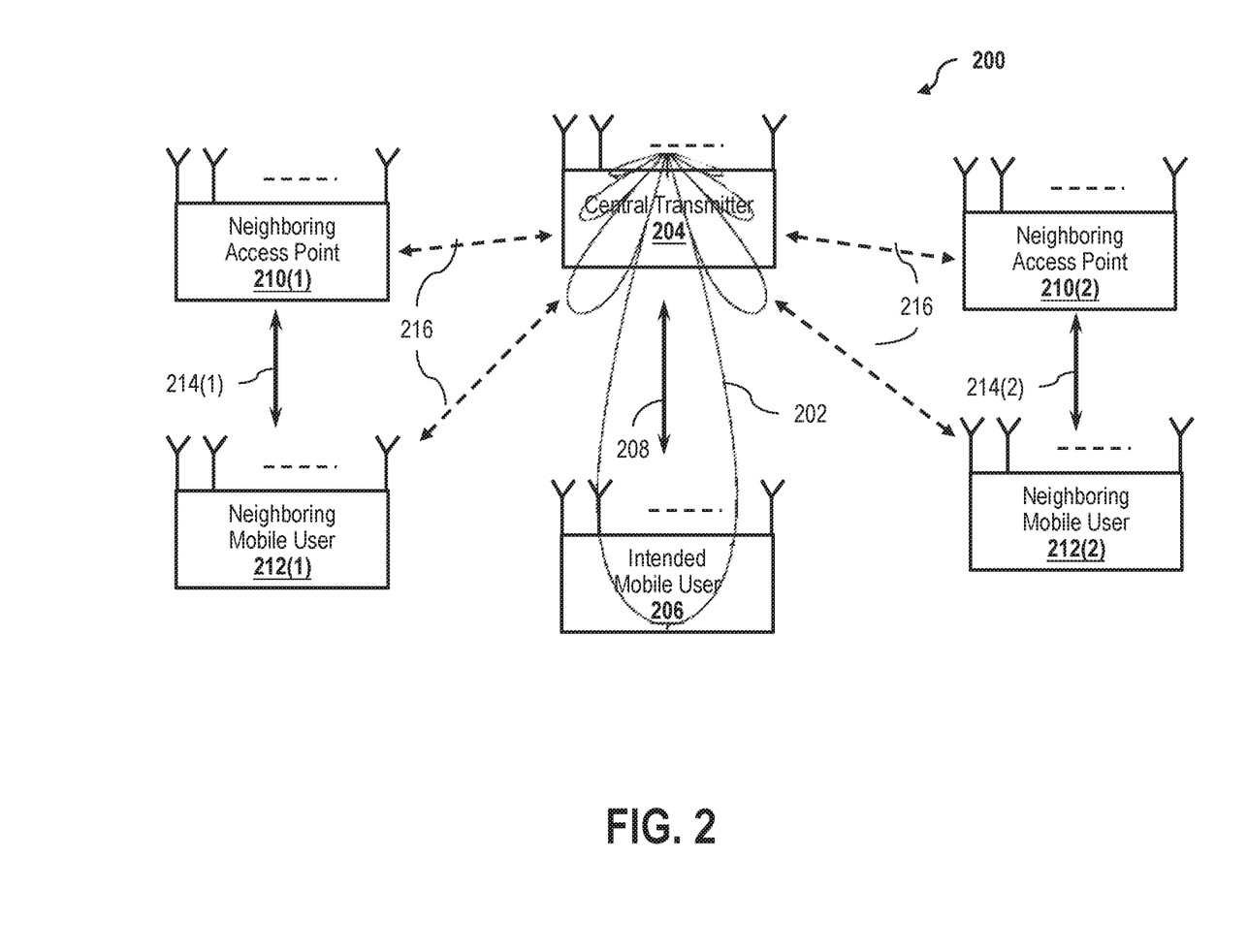
FIG. 2 is a schematic illustration of a wireless transmission system employing CSMA/CA using a beamforming pattern, according to an embodiment.

FIG. 2 is a schematic illustration of a wireless transmission system 200 employing CSMA/CA, and using a beamforming pattern 202 transmitting from a central transmitter 204. System 200 is architecturally similar to system 100, FIG. 1, and also implements a CSMA/CA protocol in a Wi-Fi/LTE LAA environment, but implements beamforming instead of a uniform beam pattern. In an exemplary embodiment, central transmitter 204 is a transmitting access point (AP). System 200 includes an intended mobile user 206, which wirelessly receives signals from central transmitter 204 over a communication link 208 under consideration. System 200 further includes a plurality of neighboring APs 210 and a plurality of neighboring mobile users 212, respectively communicating over neighboring links 214. As illustrated, the respective APs and mobile users have multiple antennas, but may have more or fewer, and a particular AP may have more antennas and signal processing capability than a particular mobile user.

Operation of neighboring APs 210 and neighboring mobile users 212 generates interferences 216 to and from central transmitter 204. Different from system 100 though, the transmitted energy from beamforming pattern 202 is focused in relatively few directions in system 200, and particularly focused in the direction of intended mobile user 206. Accordingly, by advantageously utilizing the spatial properties of the channel and beamforming pattern 202, it is significantly more likely that unintended users (i.e., neighboring APs 210 and neighboring mobile users 212) will observe considerably less interference 216 from central transmitter 204 employing beamforming, than would neighboring users under the conventional system 100 employing a uniform beam pattern. According to this advantageous architecture and technique, the transmitted energy of central transmitter 204 is directed toward intended mobile user 206, and would only back off when experiencing interference in the direction of beamforming pattern 202, or significant overlap of energy in portions thereof. Energy and power of central transmitter 204 may therefore be more efficiently managed and distributed according to the actual energy radiated a given direction.

In operation of the exemplary embodiment, central transmitter 204 acquires channel vector information of intended mobile user 206, and then performs CCA using the channel vector instead of the uniform channel sensing employed in system 100. CCA using the channel vector thus provides more accurate information regarding the interference that will actually be caused by central transmitter 204 along the channel vector. As illustrated in FIG. 2, the effect of interference 216 greatly varies but according to the energy level actually radiated in the direction of the respective portions of beamforming pattern 202. In this example, the effect of interferences 216(1) and 216(4) is almost nonexistent, while the effect of interferences 216(2) and 216(3) is relatively minimal, since interferences 216(2) and 216(3) each only overlap relatively minor portions of beamforming pattern 202.

Figure 3:
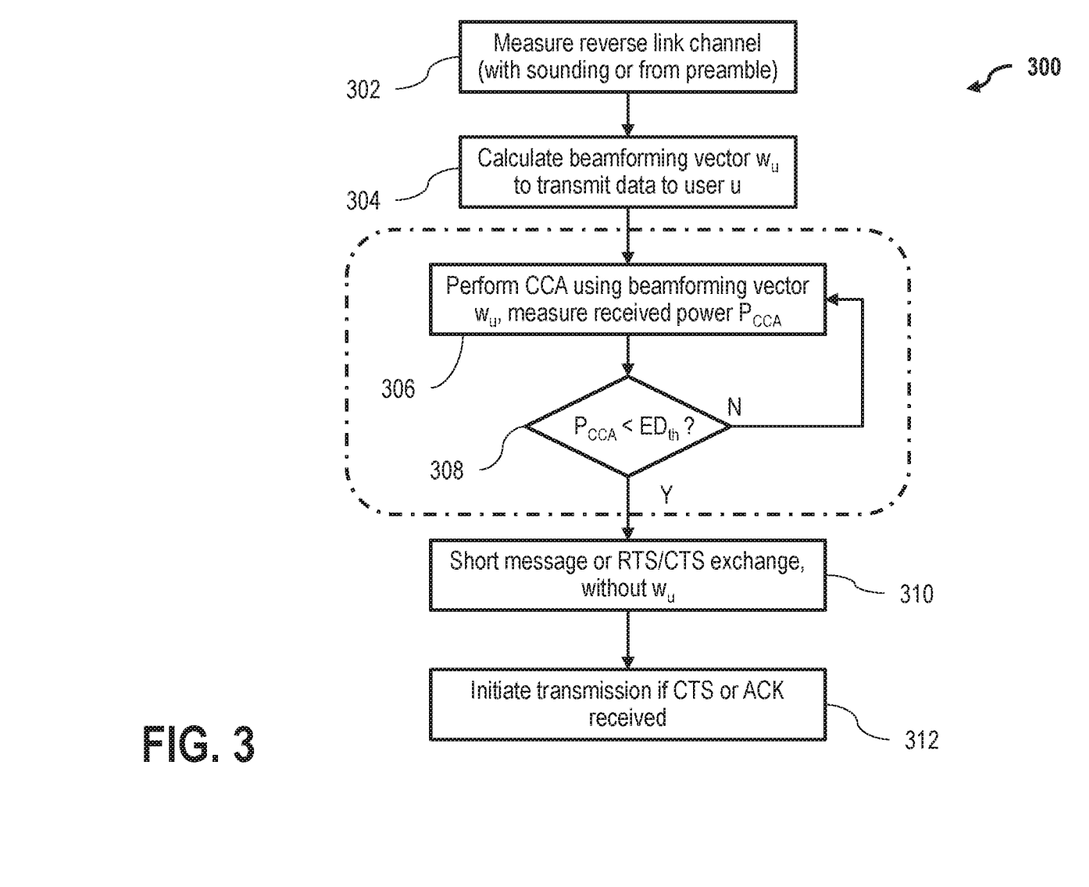
FIG. 3 is a flow chart diagram of an exemplary transmission process for the system depicted in FIG. 2.

FIG. 3 is a flow chart diagram of an exemplary transmission process 300 for system 200, FIG. 2. The exemplary embodiment, process 300 may be implemented by the MAC layer or PHY layer (not shown in this example) of central transmitter 206 in system 200, or a processor thereof. In operation, process 300 begins at step 302, in which the reverse link channel is measured. In some embodiments of step 302, the reverse link channel is measured with sounding. In other embodiments of step 302 the reverse link channel is measured from the preamble.

In step 304, the beamforming vector $w_u$ is calculated to transmit data to a user u (i.e., intended mobile user 206, FIG. 2. In step 306, as an improvement over conventional beamforming techniques, process 300 performs CCA using the beamforming vector $w_u$, and the received power therefrom, $P_{CCA}$, is then represented by $$P_{CCA} = E\left\{\left|w_u^H y\right|^2\right\}.$$

Step 308 is a decision step. In step 308, process 300 determines if the received power $_{PCCA}$ is less than an energy detection threshold ($ED_{threshold}$). If $P_{CCA} < ED_{threshold}$, then process 300 proceeds to step 310. If $P_{CCA} \geq ED_{threshold}$, then process 300 engages a back off scheme and returns to step 306.

In step 310, upon completion of CCA performance, process 300 transmits a short message, or an RTS/CTS exchange in the conventional manner, without having to use the beamforming vector $w_u$. In step 312, process 300 initiates transmission (i.e., by central transmitter 204, FIG. 2) if a CTS or an ACK is received at the receiver or receiving portion (not separately shown) of central transmitter 204. These steps are described further below with respect to FIGS. 4 and 5.

According to the advantageous techniques of process 300, CSMA is more efficiently implemented with respect to a beamforming vector. That is, in an exemplary embodiment, it may be assumed that a transmitting node (e.g., central transmitter 204, FIG. 2) obtains channel state information for a receiver (e.g., intended mobile user 206) from measurement of, or feedback from, the receiver. From this channel state information, the transmitting node advantageously calculates the beamforming vector $w=[w_0, w_1, \ldots, w_{N-1}]$, where N is the number of transmitting antennas. When a received signal from other nodes is received containing detected ACK and/or CTS messages, a potential "victim node" may be identified.

Further in this technique, received vector y is similarly defined as $y=[y_0, y_1, \ldots, y_{N-1}]$. Accordingly, the CCA performance effectively measures the average power $P_{CCA}$ according to $P_{CCA}=E\{|w^H y|^2\}$, and the back off scheme engages if this measured power is greater than the energy detection threshold $ED_{threshold}$.

The present inventor contemplates that future implementations of the present embodiments may seek to maximize the efficiency of the transmission exclusively in the direction of the beamforming focus to avoid potential interferers that may not hear the ongoing transmission (e.g., neighboring access points/nodes 210 not overlapping with the focus of beamforming pattern 202, FIG. 2). Accordingly, as explained further below with respect to FIG. 4, a transmitting node according to the systems and methods herein may be further configured to transmit RTS, CTS, and ACK/NACK frames, messages, or transmissions to neighboring nodes apart from the beamforming to mitigate this potential problem.

Figure 4:
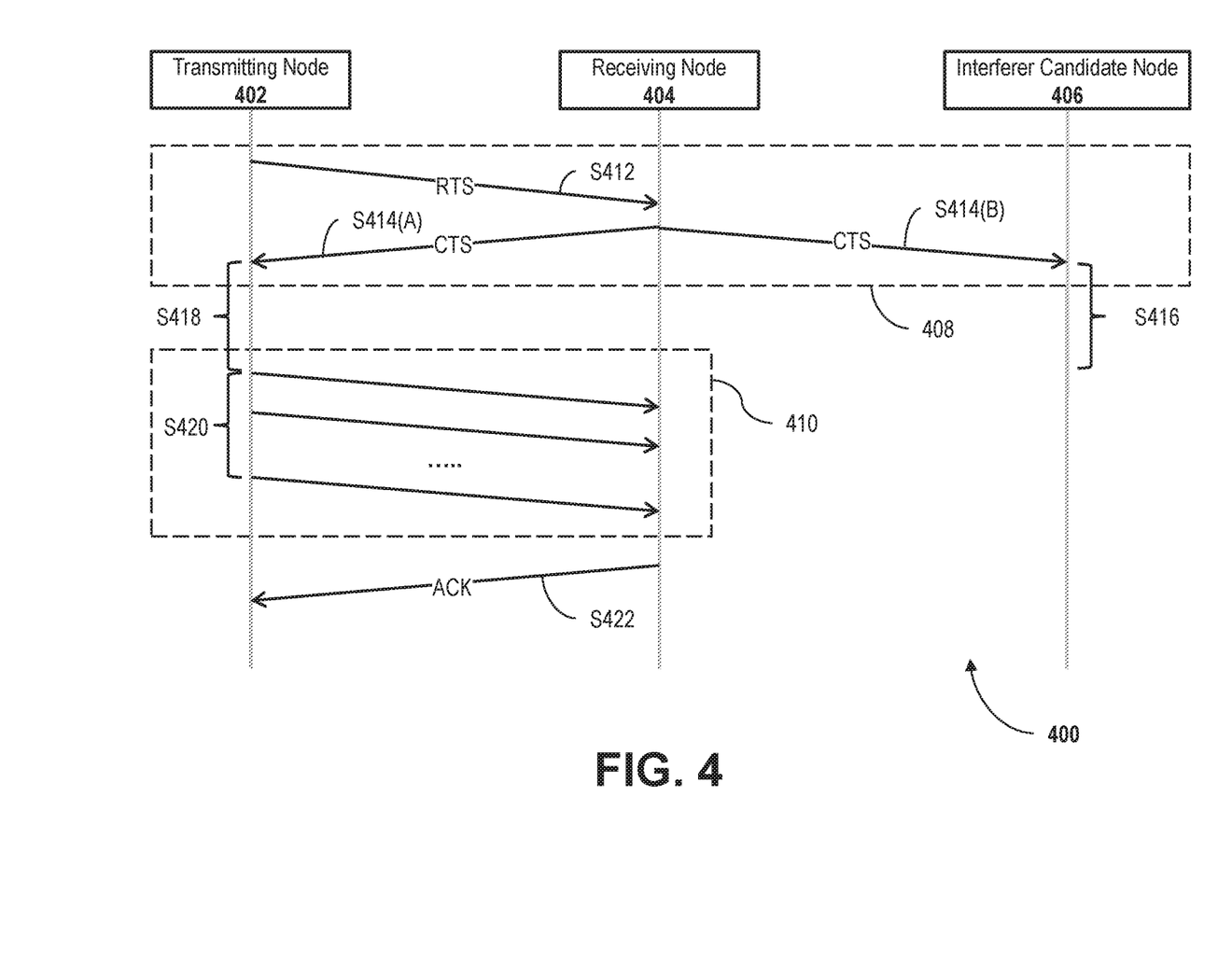
FIG. 4 is a sequence diagram for an exemplary coexistence process which may be implemented for a non-beamforming transmission, according to an embodiment.

FIG. 4 is a sequence diagram for an exemplary coexistence process 400 which may be implemented for a non-beamforming transmission. In an exemplary embodiment, process 400 illustrates steps relating to a non-beamforming transmission from a transmitting node 402 to a receiving node 404 in the vicinity of an interferer candidate node 406. That is, transmitting node 402 is configured to implement beamforming, but interferer candidate node 406 does not implement beamforming. When implemented, process 400 may execute the following steps, which are not necessarily required to be in the order listed, except where so clearly designated as being dependent on a prior step.

In this example, process 400 includes a first transmission subprocess 408 and a second transmission subprocess 410. First transmission subprocess 408 occurs without beamforming, and second transmission subprocess 410 utilizes beamforming in the transmission. Process 400 begins with first subprocess 408, and step S412. In step S412, transmitting node 402 transmits RTS data (an "RTS") to receiving node 404. In step S414, receiving node 404 transmits responsive CTS data (a "CTS") to transmitting node 402. However, as can be seen in the diagram illustrated in FIG. 4, the CTS is also received by interferer candidate node 406. According to the techniques described herein, at interferer candidate node 406, upon detection of the CTS (i.e., from step S414(B)) CCA may be performed, and interferer candidate node 406 may be configured to, in step S416, defer its transmission due to detection of the CTS. In an exemplary embodiment, for all of the relevant transmissions of first transmission subprocess 408 (i.e., data packets or ACK packets), the preamble of the respective packet is transmitted without beamforming to allow other nodes to detect the ongoing transmission. The RTS/CTS messages are also transmitted without beamforming.

Upon detection of the CTS by transmitting node 402 (i.e., from step S414(A)), transmitting node 402 initiates second transmission subprocess 410 to implement beamforming. Second transmission subprocess begins at step S418, where transmitting node 402 calculates the beamforming vector. Second transmission subprocess 410 then proceeds to step S420, where transmitting node 402 transmits one or more data transmissions with beamforming to receiving node 404. Upon receipt of the data transmission(s) with beamforming, in step S422, receiving node 404 transmits an ACK to transmitting node 402.

Thus, according to the advantageous techniques described herein, an innovative CSMA strategy is provided for a transmitting node to employ beamforming to focus its energy toward a spatial direction of interest, thereby reducing interference to other neighboring nodes in the vicinity. Because other neighboring nodes may still transmit energy in all directions (e.g., where the neighboring nodes employ a uniform beam pattern), and intended receiver may still experience interference, and not hear the transmitted signal. The advantageous process described with respect to FIG. 4 significantly mitigates this potential problem.

According to process 400, transmitting nodes that intend to begin transmission with beamforming will advantageously first exchange small data packets and/or ACK packets, or RTS/CTS messages, without beamforming to announce the impending transmission. This exchange of small amounts of data will require some additional energy from the transmitting node, but this additional transmission energy is significantly less than the amount of transmission energy saved through the efficient use of beamforming described herein.

Figure 5:
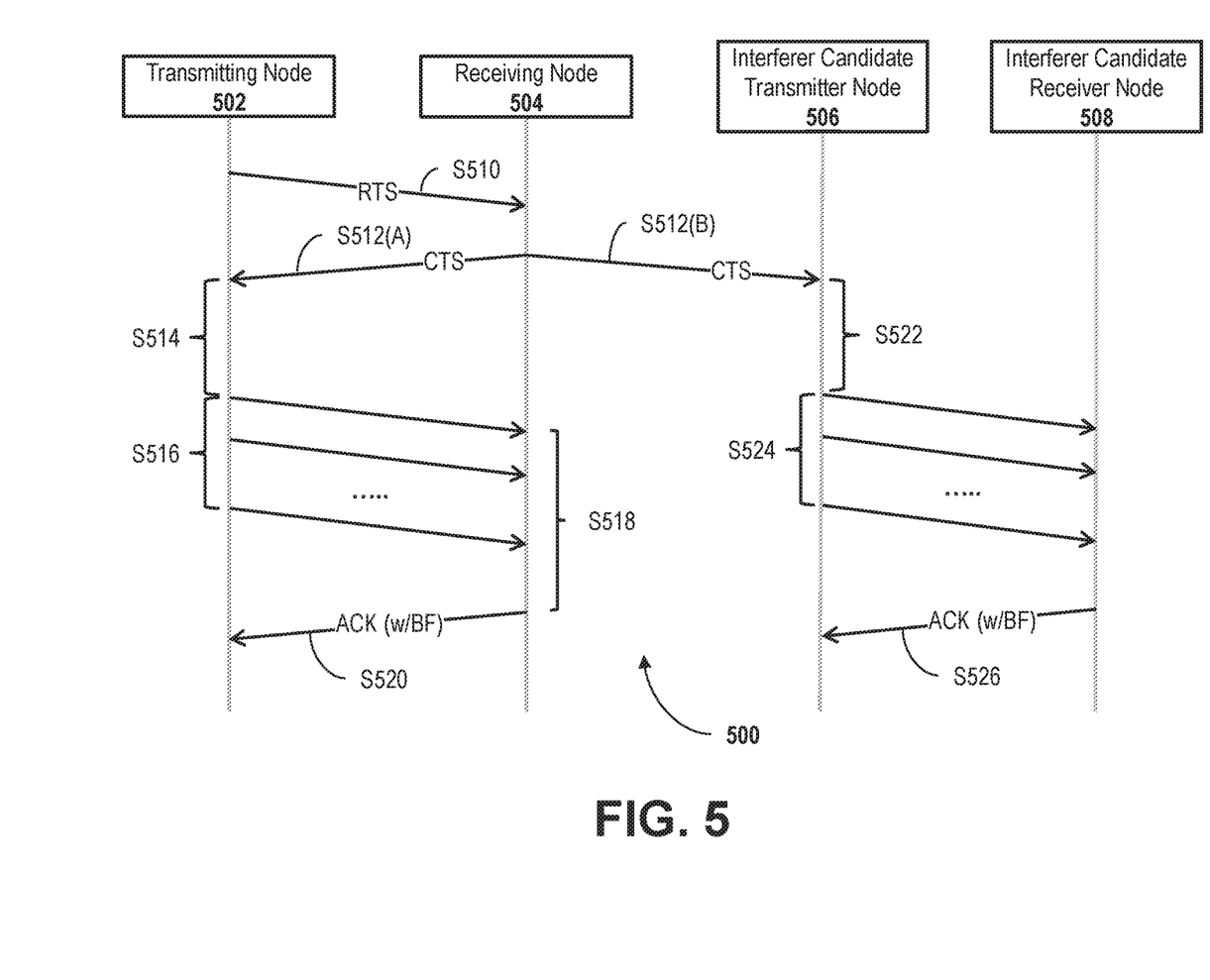
FIG. 5 is a sequence diagram for an exemplary coexistence process which may be implemented for a beamforming transmission, according to an embodiment.

FIG. 5 is a sequence diagram for an exemplary coexistence process 500 which may be implemented for a beamforming transmission. In an exemplary embodiment, process 500 illustrates steps relating to a beamforming transmission from a transmitting node 502 to a receiving node 504 in the vicinity of an interferer candidate transmitter node 506 and an interferer candidate receiver node 508 that also employ beamforming. When implemented, process 500 may execute the following steps, which are not necessarily required to be in the order listed, except where so clearly designated as being dependent on a prior step.

Process 500 begins at step S510. In step S510, transmitting node 502 transmits an RTS to receiving node 504. In step S512, receiving node 504 transmits a responsive CTS to transmitting node 502. Upon detection of the CTS by transmitting node 502 (i.e., from step S512(A)), transmitting node 502 performs transmission processing similar to second transmission subprocess 410, FIG. 4. That is, in step S514, transmitting node 502 calculates the beamforming vector, and in step S516, transmitting node 502 transmits one or more data transmissions with beamforming to receiving node 504. Process 500 then differs from second transmission subprocess 410, in that upon receipt of the data transmission(s) with beamforming, in step S518, receiving node 504 is configured to calculate the beamforming vector from the received data transmission(s). In step S520, receiving node 504 then transmits an ACK transmission with beamforming to transmitting node 502. This ACK transmission is thus different from that described above with respect to process 400 (i.e., step S422), in that the ACK of process 400 is not transmitted with beamforming (or the beamforming is optional).

Referring back to step S512, as can be seen in the diagram illustrated in FIG. 5, the CTS is also received by interferer candidate transmitter node 506. Therefore, in an exemplary embodiment, at step S522, interferer candidate transmitter node 506, upon detection of the CTS (i.e., from step S512 (B)), performs CCA with a beamforming vector targeting interferer candidate receiver node 508. In step S524, interferer candidate transmitter node 506 transmits one or more data transmissions with beamforming to interferer candidate receiver node 508. In step S528, interferer candidate receiver node 508 then transmits an ACK transmission with beamforming to interferer candidate transmitter node 506. In an exemplary embodiment, and similar to process 400, FIG. 4, preambles may be transmitted without beamforming to allow other nodes to detect the ongoing transmission. In some embodiments, the RTS/CTS messages may also be transmitted without beamforming.

Thus, according to the advantageous techniques described herein, innovative CSMA strategies are provided for a transmitting node to employ beamforming to significantly reduce transmit power in unneeded directions, whether in the vicinity of a neighboring node utilizing beamforming, or a node that does not utilized beamforming. In the embodiments described above, particular portions thereof may be implemented alone or in combination with one or more of the other respective portions. In some embodiments, the steps of the several processes may be implemented simultaneously, or in succession, except where a particular order is expressly stated. In the exemplary embodiments, a transmitter/transceiver or node utilizing beamforming is configured to a particular channel of the wireless spectrum, and may adapt its protocol in order to maintain efficiency through utilization of the spatial properties of the channel.

Accordingly, the novel systems and methods described above realize significant advantages over conventional systems that implement CSMA or utilize beamforming. The present embodiments implement innovative techniques to more efficiently utilize transmitter power according to the spatial properties of the channel, and according to the spatial beam pattern of neighboring or interfering nodes, when encountered. Algorithms to implement any or all the above described processes or techniques may be implemented within an application processor, a MAC co-processor, or the UMAC/LMAC layers of supporting architecture of a station and/or an AP, for the respective processor of a node transmitter, receiver, or transceiver.

Exemplary embodiments of CSMA protocols using beamforming are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wireless communication node configured for operable communication with one or more local user devices proximate the wireless communication node, comprising:
   a receiver configured to (i) obtain channel state information from a first user device of the one or more local user devices, and (ii) detect an operation of a remote first neighboring node in operable communication with one or more neighboring user devices proximate the first neighboring node, wherein the one or more neighboring user devices are different from the one or more local user devices;
   a transmitter configured to transmit over a wireless communication channel a plurality of data packets to the first local user device, wherein the first neighboring node is different from the one or more neighboring user devices; and
   a processor configured to (i) calculate a first beamforming vector for the first local user device based on the obtained channel state information and the detected operation of the first neighboring node, and (ii) direct the transmitter portion to transmit the plurality of data packets to the first local user device with beamforming based on the calculated first beamforming vector.

2. the wireless communication node of claim 1 wherein the transmitter is further configured to transmit at least one RTS message.

3. the wireless communication node of claim 2, wherein the transmitter is further configured to transmit the at least one RTS message without beamforming.

4. The wireless communication node of claim 2, wherein the receiver is further configured to detect the operation of the first neighboring node by receiving at least one CTS message in response to the at least one RTS message.

5. The wireless communication node of claim 1, wherein the transmitter is further configured to transmit one or more preambles of individual data packets of the plurality of data packets without beamforming.

6. The wireless communication node of claim 1, further comprising a plurality of antennas, and wherein the calculated first beamforming vector is based. on a quantity of the plurality of antennas.

7. The wireless communication node of claim 1, wherein the processor is further configured to perform clear channel assessment (CCA) using the calculated first beamforming vector.

8. The wireless communication node of claim 7, wherein the processor is further configured to determine an amount of average received power based on the performed CCA.

9. The wireless communication node of claim 8, wherein the processor is further configured to direct the transmitter to implement a back off scheme when the determined amount of received power is greater than a predetermined energy detection threshold.

10. the wireless communication node of claim 9, wherein the back off scheme comprises a carrier sense multiple access with collision detection protocol.

11. the wireless communication node of claim 1, wherein the wireless communication channel utilizes one or more of a Wi-Fi and a long term evolution protocol.

12. The system of claim 1, wherein the local user devices and neighboring user devices comprise at least one mobile user equipment device, and wherein at least one of the wireless communication node and the first neighboring node comprise an access point.

13. A method for node-to-node transmission over a wireless communication channel, the method performed by a first node employing a carrier sense multiple access (CSMA) protocol, the method comprising the steps of:

performing a clear channel assessment (CCA) on the wireless communication channel; transmitting one or more RTS messages over the wireless communication channel after completion of the CCA;

receiving, from a second node within a transmission vicinity of the first node, at least one CTS message responsive to the one or more RTS messages;

calculating a first beamforming vector to transmit a first data transmission from the first node to the second node;

transmitting the first data transmission to the second node according to the first beamforming vector;

initiating the first data transmission with beamforming over the wireless communication channel to the second node according to the calculated first beamforming vector; and receiving, from the second node, an acknowledgment message for the first data transmission, wherein the acknowledgment message is received according to a second beamforming vector, different from the first beamforming vector, calculated by the second node based on the first data transmission received at the second node.

14. the method of claim 13, wherein the first node comprises an access point.

15. the method of claim 13, wherein the second node is an access point.

16. the method of claim 13, further comprising, prior to the step of transmitting the one or more RTS messages, a step of measuring an average received power of the wireless communication channel based on the CCA.

17. The method of claim 16, further comprising, prior to the step of transmitting the one or more RTS messages, a step of determining that the measured average, received power of the wireless communication channel is less than a predetermined energy detection threshold.

* * * * *